US010310654B2

(12) United States Patent
Hashida et al.

(10) Patent No.: US 10,310,654 B2
(45) Date of Patent: Jun. 4, 2019

(54) INPUT DEVICE HAVING FLEXIBLE CIRCUIT BOARD

(71) Applicant: Alps Alpine Co., Ltd., Ota-ku, Tokyo (JP)

(72) Inventors: Junji Hashida, Niigata-ken (JP); Toru Sawada, Niigata-ken (JP); Yoshifumi Masumoto, Niigata-ken (JP); Atsushi Matsuda, Niigata-ken (JP); Toru Takahashi, Niigata-ken (JP)

(73) Assignee: Alps Alpine Co., Ltd., Tokyo (JP)

( * ) Notice: Subject to any disclaimer, the term of this patent is extended or adjusted under 35 U.S.C. 154(b) by 0 days.

(21) Appl. No.: 15/809,168

(22) Filed: Nov. 10, 2017

(65) Prior Publication Data

US 2018/0074631 A1 Mar. 15, 2018

Related U.S. Application Data

(63) Continuation of application No. PCT/JP2016/063207, filed on Apr. 27, 2016.

(30) Foreign Application Priority Data

Jul. 7, 2015 (JP) ................................ 2015-136492

(51) Int. Cl.
*G06F 3/041* (2006.01)
*B32B 27/38* (2006.01)
(Continued)

(52) U.S. Cl.
CPC ............ *G06F 3/0412* (2013.01); *B32B 27/38* (2013.01); *G06F 3/044* (2013.01); *G06F 3/047* (2013.01);
(Continued)

(58) Field of Classification Search
CPC ......... G06F 3/041; G06F 3/045; G01R 27/26; G06K 11/06; G08C 21/00
See application file for complete search history.

(56) References Cited

U.S. PATENT DOCUMENTS

2004/0130500 A1* 7/2004 Takei .............. G06K 19/07728 343/895
2005/0062153 A1* 3/2005 Saito ................ H01L 23/49816 257/737

(Continued)

FOREIGN PATENT DOCUMENTS

JP 2010-39621 2/2010
JP 2011-197709 10/2011

(Continued)

OTHER PUBLICATIONS

International Search Report dated May 31, 2016 from International Application No. PCT/JP2016/063207.

*Primary Examiner* — Pegeman Karimi
(74) *Attorney, Agent, or Firm* — Beyer Law Group LLP

(57) ABSTRACT

An input device includes a light-transmissive panel made of synthetic resin, an electrode layer, a decorative layer disposed on an inner surface of the panel, and an inner resin layer disposed on a surface of the decorative layer. The inner resin layer has a connection pattern on a surface thereof. The connection pattern is in electrical communication with the electrode layer. The input device further includes a flexible printed circuit board joined to the surface of the inner resin layer by thermocompression bonding.

7 Claims, 3 Drawing Sheets

(51) Int. Cl.
*G06F 3/044* (2006.01)
*G06F 3/047* (2006.01)

(52) U.S. Cl.
CPC .............. *G06F 2203/04103* (2013.01); *G06F 2203/04112* (2013.01)

(56) References Cited

U.S. PATENT DOCUMENTS

| | | | | |
|---|---|---|---|---|
| 2007/0013856 | A1* | 1/2007 | Watanabe | G02F 1/13452 349/150 |
| 2010/0033443 | A1* | 2/2010 | Hashimoto | G06F 3/0418 345/173 |
| 2011/0227846 | A1* | 9/2011 | Imazeki | G06F 3/044 345/173 |
| 2012/0249453 | A1 | 10/2012 | Tsukamoto | |
| 2013/0299789 | A1* | 11/2013 | Yamazaki | H01L 51/5246 257/40 |
| 2013/0322032 | A1 | 12/2013 | Shigetaka et al. | |
| 2016/0209959 | A1* | 7/2016 | Lee | G06F 3/044 |
| 2016/0239121 | A1 | 8/2016 | Murakami et al. | |
| 2016/0293682 | A1* | 10/2016 | Park | H01L 51/5275 |

FOREIGN PATENT DOCUMENTS

| | | |
|---|---|---|
| JP | 2012-208621 | 10/2012 |
| JP | 2013-251343 | 12/2013 |
| JP | 2015-069267 | 4/2015 |

* cited by examiner

INPUT DEVICE HAVING FLEXIBLE CIRCUIT BOARD

CLAIM OF PRIORITY

This application is a Continuation of International Application No. PCT/JP2016/063207 filed on Apr. 27, 2016, which claims benefit of Japanese Patent Application No. 2015-136492 filed on Jul. 7, 2015. The entire contents of each application noted above are hereby incorporated by reference.

BACKGROUND OF THE INVENTION

1. Field of the Invention

The present invention relates to an input device including a light-transmissive panel, a light-transmissive electrode layer, and a decorative layer such that the electrode layer and the decorative layer are arranged on an inner surface of the panel.

2. Description of the Related Art

Japanese Unexamined Patent Application Publication No. 2011-197709 discloses an invention relating to a touch panel.

The touch panel disclosed in Japanese Unexamined Patent Application Publication No. 2011-197709 includes a cover glass plate having a first surface, serving as an input operation surface, and a second surface opposite the first surface. The touch panel further includes input detection electrodes and peripheral wiring lines arranged on the second surface.

The touch panel disclosed in Japanese Unexamined Patent Application Publication No. 2011-197709 includes a black light-shielding printed layer disposed in part of the second surface of the cover glass plate as illustrated in FIG. 4 of Japanese Unexamined Patent Application Publication No. 2011-197709. The input detection electrodes and the peripheral wiring lines formed of an indium tin oxide (ITO) film are arranged on the second surface. End portions of the peripheral wiring lines extend on the light-shielding printed layer, thus providing mounting terminals.

As illustrated in FIG. 5 of Japanese Unexamined Patent Application Publication No. 2011-197709, a flexible printed circuit board overlaps an arrangement area of the mounting terminals. The mounting terminals arranged on the light-shielding printed layer are joined to a conductive layer of the flexible printed circuit board.

A junction region of the mounting terminals and the flexible printed circuit board is covered with a colored printed layer.

Japanese Unexamined Patent Application Publication No. 2012-208621 discloses an input device including a transparent panel, a decorative layer, transparent electrodes, and a wiring layer such that the decorative layer is disposed on ends of an inner surface of the transparent panel, the transparent electrodes overlap a surface of the decorative layer, and the wiring layer is disposed on the transparent electrodes. In this input device, parts of the wiring layer disposed on the decorative layer form external connecting portions. A flexible printed circuit board overlaps and is joined to the external connecting portions.

In the touch panel disclosed in Japanese Unexamined Patent Application Publication No. 2011-197709, the flexible printed circuit board overlaps the mounting terminals on the light-shielding printed layer disposed on the second surface of the cover glass plate. The flexible printed circuit board is joined to the mounting terminals by soldering or with an anisotropic conductive film or conductive paste. In this joining process, the flexible printed circuit board in a heated state is pressed against the cover glass plate, so that heat and pressure act on the light-shielding printed layer and the light-shielding printed layer tends to be partially distorted. Such distortion is visible from a front side of the cover glass plate. The junction region of the flexible printed circuit board is accordingly noticeable, resulting in a deterioration in appearance of such a product.

In the input device disclosed in Japanese Unexamined Patent Application Publication No. 2012-208621, since the flexible printed circuit board is joined to the external connecting portions arranged on the decorative layer, the decorative layer tends to be distorted at a junction to the flexible printed circuit board as in Japanese Unexamined Patent Application Publication No. 2011-197709. Japanese Unexamined Patent Application Publication No. 2012-208621 describes that the transparent panel may be made of transparent plastic. In this case, not only the decorative layer but also the transparent plastic panel tend to suffer damage, such as distortion, when the flexible printed circuit board is joined to the external connecting portions. Unfortunately, a region of the junction to the flexible printed circuit board is noticeable when the completed input device is viewed from a front side of the transparent panel.

To reduce damage to the light-shielding printed layer or the decorative layer and further reduce damage to the transparent plastic panel, a way or means of joining the flexible printed circuit board has to be adjusted so that the flexible printed circuit board can be joined at low temperature with low pressure. However, this adjustment results in a reduction in bonding strength of the flexible printed circuit board.

SUMMARY OF THE INVENTION

The present invention is intended to overcome the above-described known problems and provides an input device including a light-transmissive panel, a flexible printed circuit board, and a decorative layer disposed on an inner surface of the light-transmissive panel and suffered little damage when connected to the flexible printed circuit board.

An aspect of the present invention provides an input device including a light-transmissive panel having a light-transmissive area and a light-shielding area, a light-transmissive electrode layer disposed in the light-transmissive area on an inner surface of the panel, a non-light-transmissive decorative layer disposed in the light-shielding area on the inner surface of the panel, an inner resin layer disposed on a surface of the decorative layer and having thereon a conductive connection pattern in electrical communication with the electrode layer, and a flexible printed circuit board overlapping the inner resin layer and having thereon a wiring pattern. The wiring pattern on the flexible printed circuit board is joined to the connection pattern.

The flexible printed circuit board may be joined to the inner resin layer by thermocompression bonding.

In one aspect, preferably, the inner resin layer is made of a resin material having a higher modulus of elasticity than a resin material that the decorative layer is made of.

It is also preferable that the inner resin layer is made of a resin material having a higher softening temperature than a resin material that the decorative layer is made of.

In one aspect, for example, the decorative layer may be made of acrylic resin and the inner resin layer may be made of epoxy resin.

In one aspect, it is preferable that the input device further includes an auxiliary resin layer disposed in a step defined by the surface of the decorative layer and an end of the inner resin layer.

In one aspect, it is preferable that the inner resin layer includes a plurality of sublayers stacked such that an end of an upper sublayer of the inner resin layer is misaligned with an end of a lower sublayer of the inner resin layer. Preferably, the panel may be made of synthetic resin.

In the input device according to one aspect of the present invention, the inner resin layer is disposed on the decorative layer disposed on the light-transmissive panel, and the wiring pattern of the flexible printed circuit board is joined to the connection pattern on the inner resin layer. This arrangement allows the inner resin layer to relieve heat and pressure applied when the flexible printed circuit board is joined by thermocompression bonding, thus reducing damage to the decorative layer. When the panel is made of synthetic resin, damage to the panel can be reduced.

DESCRIPTION OF THE PREFERRED EMBODIMENTS

Figure 1:
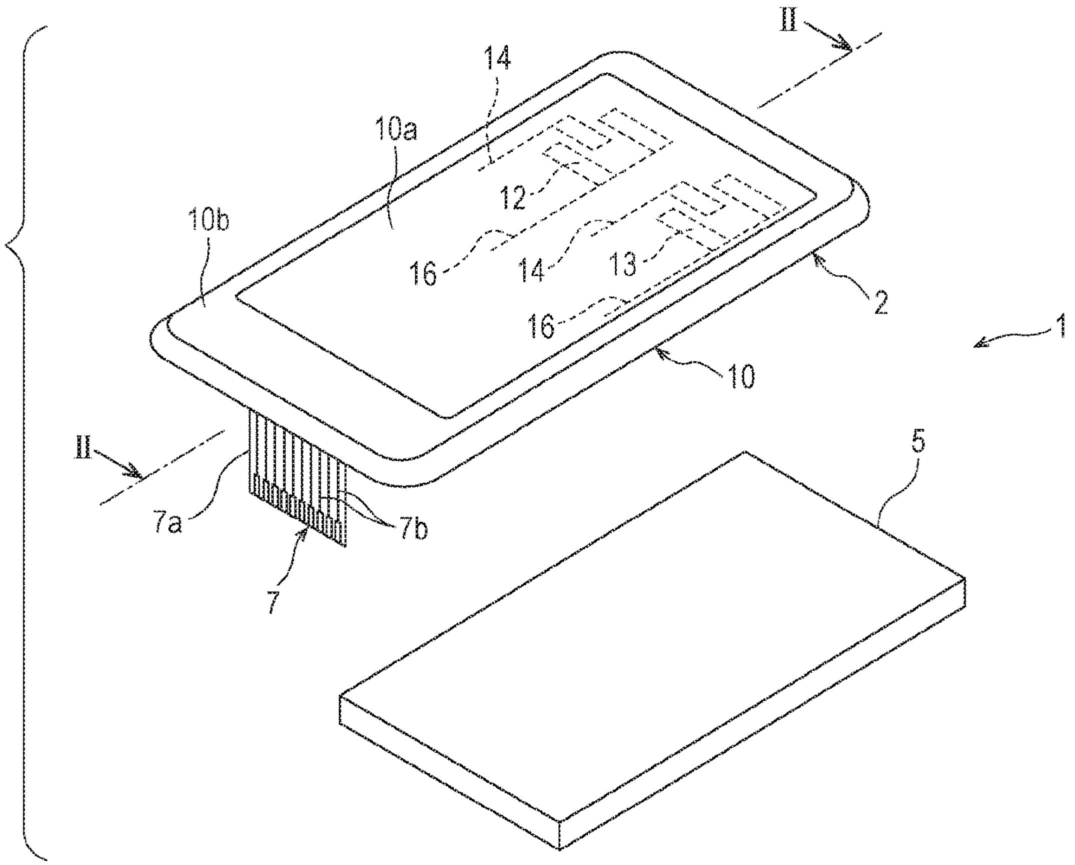
FIG. 1 is an exploded perspective view of an input device according to an embodiment of the present invention and illustrates the overall structure of the input device.
Figure 2:
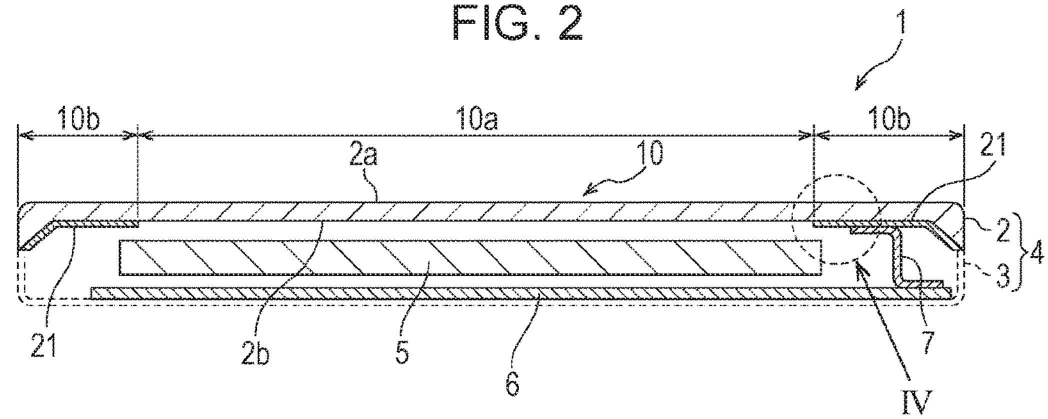
FIG. 2 is a cross-sectional view of the input device taken along the line II-II in FIG. 1.

FIGS. 1 and 2 illustrate an electronic apparatus 1, which is used as, for example, a cellular phone, a portable information processor, a portable storage device, or a portable game machine.

The electronic apparatus 1 includes a light-transmissive panel 2. As used herein, light-transmissivity means, for example, a total light transmittance of 60% or more, preferably a total light transmittance of 80% or more.

The panel 2 serves as a front panel or an operation panel. As illustrated in FIG. 2, the panel 2 is combined with a lower case 3, thus forming a main body case 4 of the electronic apparatus 1, such as a cellular phone. The panel 2 accordingly serves as a component of the main body case 4. The main body case 4 accommodates, for example, a self-luminous display panel 5, such as a liquid crystal display panel including a back lighting unit or an electroluminescent panel, and a printed circuit board 6 on which electronic components are mounted. The panel 2 is connected to the printed circuit board 6 by a flexible printed circuit board 7.

An input device 10 according to an embodiment of the present invention mainly includes the panel 2, electrode layer segments 12 and 13, wiring line layer segments 14 and 16, a decorative layer 21, an inner resin layer 22, and the flexible printed circuit board 7 such that the electrode layer segments, the wiring line layer segments, the decorative layer, and the inner resin layer are arranged on the panel 2.

The panel 2 illustrated in FIGS. 1 and 2 may be made of a light-transmissive synthetic resin material, such as acrylic resin or polycarbonate resin. Referring to FIG. 2, the panel 2 has an outwardly facing outer surface 2*a*, serving as an operation surface, and an inner surface 2*b* facing the inside of the main body case 4.

Figure 3:
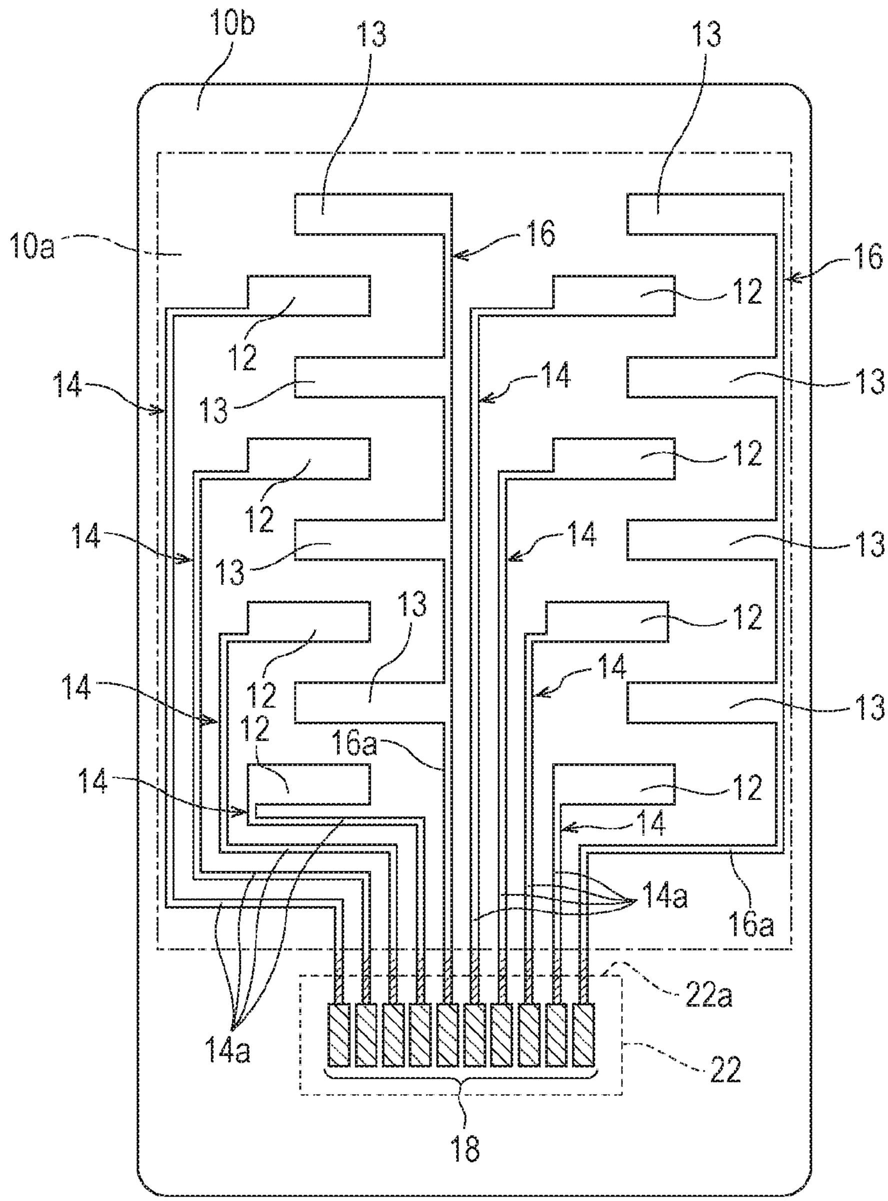
FIG. 3 is a partially see-through plan view of the input device and illustrates electrode layer segments and wiring line layer segments arranged on an inner surface of a panel of the input device.

As illustrated in FIGS. 1 and 3, the panel 2 has a rectangular light-transmissive area 10*a* located in substantially central part of the panel 2 and a frame-shaped light-shielding area 10*b* surrounding four sides of the light-transmissive area 10*a*.

Referring to FIGS. 1 and 3, the light-transmissive electrode layer segments 12 and 13 are arranged in the light-transmissive area 10*a* on the inner surface 2*b* of the panel 2. The light-transmissive electrode layer segments 12 and 13 are made of indium tin oxide (ITO). Alternatively, the light-transmissive electrode layer segments 12 and 13 may be formed of, for example, a conductive layer containing a conductive nanomaterial or a meshed metal layer, serving as a net of metal wires.

Examples of the conductive nanomaterial include metal nanowire made of at least one selected from the group consisting of Ag, Au, Ni, Cu, Pd, Pt, Rh, Ir, Ru, Os, Fe, Co, and Sn and carbon fiber, such as carbon nanotube. Such a conductive nanomaterial dispersed by a dispersant is applied to the inner surface 2*b* of the panel 2 and is fixed to the inner surface 2*b* by using a transparent resin material.

The meshed metal layer is formed by printing a net of metal, such as Au, Ag, or Cu on the inner surface 2*b* of the panel 2 or by forming a layer of the metal having a uniform thickness on the inner surface 2*b* of the panel 2 and etching the layer.

The light-transmissive conductive layer formed on the inner surface 2*b* of the panel 2 is patterned by etching, thus forming the individual electrode layer segments 12, the common electrode layer segments 13, the individual wiring line layer segments 14 extending integrally from the individual electrode layer segments 12, and the common wiring line layer segments 16 extending integrally from the common electrode layer segments 13.

The individual electrode layer segments 12 and the common electrode layer segments 13 are regularly arranged. Referring to FIG. 3, the individual electrode layer segments 12 and the common electrode layer segments 13 are staggered in a longitudinal direction (vertical direction in FIG. 3) of the panel 2. The individual wiring line layer segments 14 extend from the respective individual electrode layer segments 12. The single common wiring line layer segment 16 extends from four common electrode layer segments 13 arranged in the longitudinal direction.

Referring to FIGS. 1 and 3, when the individual wiring line layer segments 14 and the common wiring line layer segments 16 are formed within the light-transmissive area 10*a*, these wiring line layer segments 14 and 16 are formed of the light-transmissive conductive layer made of, for example, ITO. When the wiring lines 14 and 16 are formed in the light-shielding area 10*b*, the wiring line layer segments can be formed by covering the light-transmissive conductive layer with a layer of low-resistance material, such as Ag paste.

Referring to FIG. 2, the decorative layer 21 is disposed in the light-shielding area 10*b* on the inner surface 2*b* of the panel 2. The decorative layer 21 is illustrated in enlarged view in FIGS. 4A and 4B. The decorative layer 21 is a colored ink layer containing acrylic resin and pigment for coloring. The colored ink layer is formed on the inner surface 2*b* of the panel 2 by, for example, screen printing, and the formed layer is subjected to heat treatment, thus forming the decorative layer 21.

Openings for installation of a loudspeaker, a microphone, and a camera lens, which are not illustrated in FIG. 1, are arranged in the light-shielding area 10*b* of the panel 2. The decorative layer 21 is not formed in these openings.

Figure 4A:
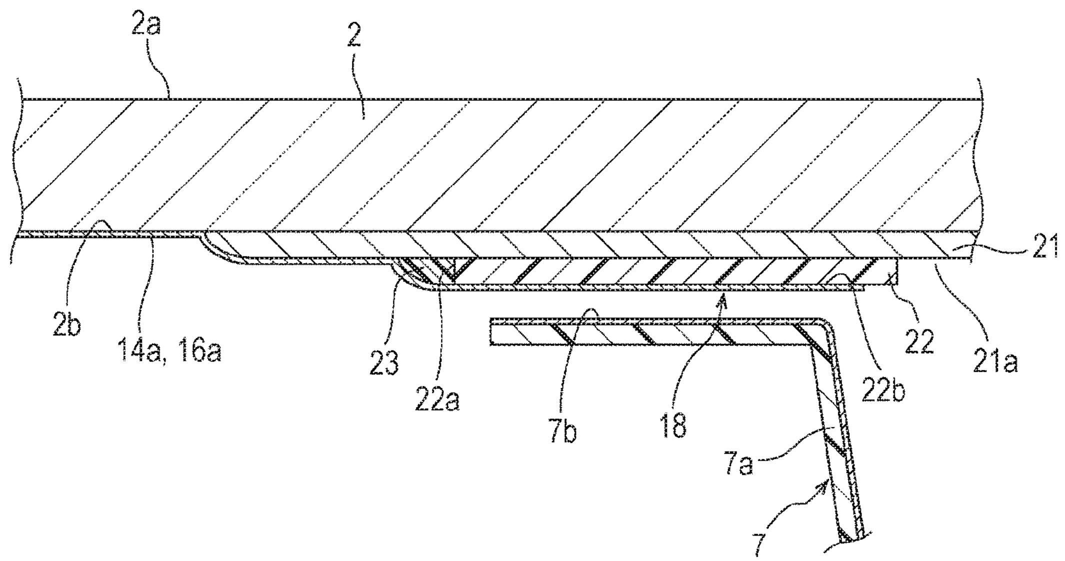
FIGS. 4A and 4B are enlarged sectional views of part indicated by the arrow IV in FIG. 2 and illustrate different embodiments.

Referring to FIG. 4A, the inner resin layer 22 is disposed on a surface (lower surface) 21*a* of the decorative layer 21 in the light-shielding area 10*b*. The decorative layer 21 may be made of a thermoplastic resin material, such as acrylic resin, whereas the inner resin layer 22 may be made of a thermosetting resin material, such as epoxy resin. FIG. 3 illustrates a rectangular region where the inner resin layer 22 is disposed.

The inner resin layer 22 has a higher modulus of elasticity (Young's modulus) than the decorative layer 21. The inner resin layer 22 has a higher softening temperature than the decorative layer 21. The inner resin layer 22 is preferably 0.5 or more times as thick as the decorative layer 21, more preferably 1 or more times as thick as the decorative layer 21.

FIG. 4A illustrates an embodiment in which an auxiliary resin layer 23 is disposed between the surface 21*a* of the decorative layer 21 and an end 22*a* of the inner resin layer 22 facing the light-transmissive area 10*a* to eliminate a step defined by the end 22*a*. The auxiliary resin layer 23 serves as a smooth raised portion sloping from the surface 21*a* of the decorative layer 21 to a surface 22*b* of the inner resin layer 22. The auxiliary resin layer 23 is made of thermoplastic resin, such as acrylic resin.

Referring to FIG. 3, terminal portions 14*a* of the individual wiring line layer segments 14 and terminal portions 16*a* of the common wiring line layer segments 16 extend downwardly in FIG. 3 toward substantially middle part of the panel 2 in a lateral direction of the panel 2. As illustrated in FIG. 4A, the terminal portions 14*a* and 16*a* extend on the surface 21*a* of the decorative layer 21 and the surface 22*b* of the inner resin layer 22. As illustrated in FIG. 3, the terminal portions 14*a* and 16*a* of the respective wiring line layer segments 14 and 16 are increased in width on the surface 22*b* of the inner resin layer 22, thus providing connection pattern segments 18.

The connection pattern segments 18 may be formed by continuously extending the light-transmissive conductive layer, which is made of, for example, ITO, and serves as the electrode layer segments 12 and 13 and the wiring line layer segments 14 and 16, on the surface 21*a* of the decorative layer 21 and the surface 22*b* of the inner resin layer 22. Alternatively, the connection pattern segments 18 may be formed by continuously extending the light-transmissive conductive layer, serving as the electrode layer segments 12 and 13 and the wiring line layer segments 14 and 16, disposed on the surface 21*a* of the decorative layer 21 and the surface 22*b* of the inner resin layer 22, and covering the light-transmissive conductive layer, disposed on the surface 21*a* of the decorative layer 21 and the surface 22*b* of the inner resin layer 22, with a low-resistance metal layer of, for example, Ag paste. Alternatively, the terminal portions 14*a* and 16*a* formed of the light-transmissive conductive layer may be formed so as to extend up to the boundary between the light-transmissive area 10*a* and the light-shielding area 10*b*, and the connection pattern segments 18 may be formed by forming a low-resistance metal layer of, for example, Ag paste, on the surface 21*a* of the decorative layer 21 and the surface 22*b* of the inner resin layer 22 such that the low-resistance metal layer is in electrical communication with the terminal portions 14*a* and 16*a*.

Figure 4B:
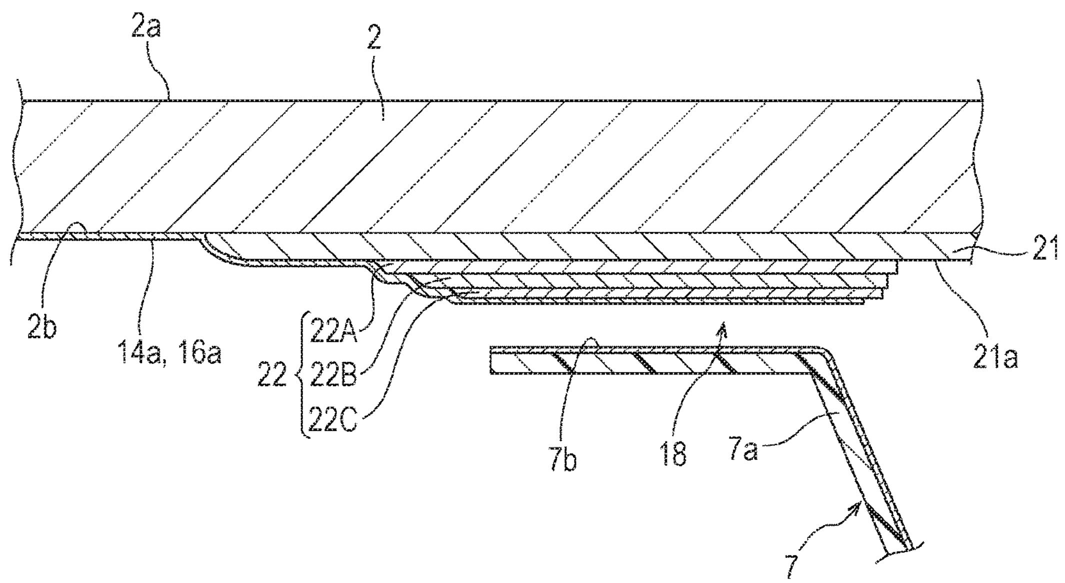

As illustrated in FIGS. 1, 4A, and 4B, the flexible printed circuit board 7 includes a flexible film substrate 7*a* and wiring pattern segments 7*b* made of, for example, Cu foil, on a surface of a first end portion of the film substrate 7*a*. As illustrated in FIG. 4A, the flexible printed circuit board 7 is joined to the surface 22*b* of the inner resin layer 22 such that the wiring pattern segments 7*b* face the connection pattern segments 18 in a one-to-one correspondence manner. This joining may be achieved by thermocompression bonding such that a sheet or paste of anisotropic conductive adhesive is disposed between the inner resin layer 22 and the flexible printed circuit board 7 and the flexible printed circuit board 7 is pressed against the inner resin layer 22 with a heated tool. The thermocompression bonding enables the inner resin layer 22 to be bonded and joined to the flexible printed circuit board 7, with the anisotropic conductive adhesive therebetween. Thus, the wiring pattern segments 7*b* are joined to the connection pattern segments 18.

The inner resin layer 22 is disposed on the surface 21*a* of the decorative layer 21. The modulus of elasticity and the softening temperature of the inner resin layer 22 are higher than those of the decorative layer 21. Therefore, the inner resin layer 22 absorbs heat and pressure applied when the flexible printed circuit board 7 is joined to the inner resin layer 22 by thermocompression bonding, thus reducing damage to the decorative layer 21, for example, heat and pressure induced distortion of the decorative layer 21. Although the panel 2 is made of synthetic resin, damage, such as distortion, to the panel 2 is also reduced as the damage to the decorative layer 21 is little.

This reduction lowers the possibility that deformation marks or distortion marks of the decorative layer 21 may be caused by connecting the flexible printed circuit board 7 to the decorative layer 21 and the marks may be visually identified when the panel 2 is viewed from the front, thus allowing the main body case 4 to have a good appearance.

A second end portion of the flexible printed circuit board 7 is connected to a conductor pattern on the printed circuit board 6.

In the embodiment illustrated in FIG. 4A, since the auxiliary resin layer 23 is provided to eliminate the step defined by the end 22*a* of the inner resin layer 22, the connection pattern segments 18 over the end 22*a* are allowed to have a sufficient thickness.

FIG. 4B illustrates another embodiment in which the inner resin layer 22 includes two or more sublayers 22A, 22B, and 22C stacked. The sublayers 22A, 22B, and 22C are sequentially formed in this order on the surface 21*a* of the decorative layer 21 such that an end of an upper layer is misaligned with an end of a lower layer to be away from the light-transmissive area 10*a*. Such arrangement can eliminate a step defined by the end of the inner resin layer 22. The connection pattern segments 18 are formed so as to smoothly extend from the surface 21*a* of the decorative layer 21 onto a surface of the uppermost sublayer 22C of the inner resin layer 22.

An operation of the input device 10 with the above-described structure will now be described.

In this input device 10, the wiring pattern segments 7*b* of the flexible printed circuit board 7 are sequentially connected to a driving circuit by a multiplexer. A pulsed driving voltage is sequentially applied to the individual electrode layer segments 12. The multiplexer allows the common electrode layer segments 13 to serve as detection electrodes. Capacitance is formed between each individual electrode layer segment 12 and the corresponding common electrode layer segment 13. When the pulsed driving voltage is applied to any of the individual electrode layer segments 12, a potential based on a mutual coupling capacitance appears at the corresponding common electrode layer segment 13 in response to rising and falling edges of the pulse.

The light-transmissive area 10*a* of the panel 2 allows an image on the display panel 5 to be visible through the panel 2. When a finger or a hand, serving as a conductor, approaches the outer surface 2*a* of the panel 2 in the light-transmissive area 10*a*, the finger or hand absorbs an electric field from any of the individual electrode layer segments 12, thus changing a potential appearing at the corresponding common electrode layer segment 13 as the mutual coupling capacitance between the electrode layer segments is reduced. The position of the approaching finger or hand can be determined based on information about a change in potential appearing at the common electrode layer segment 13 and information about which individual electrode layer segment 12 the driving voltage is applied to.

Conversely, the pulsed driving voltage may be applied to the common electrode layer segments 13 and the individual electrode layer segments 12 may be sequentially switched and connected to a detection circuit. The position of an approaching finger or hand can also be determined in this case.

What is claimed is:

1. An input device comprising:

a panel made of a light-transmissive material, the panel having a light-transmissive area and a light-shielding area;

an electrode layer formed of a light-transmissive material, the electrode layer being disposed on an inner surface of the panel in the light-transmissive area;

a decorative layer formed of a non-light-transmissive material, the decorative layer being disposed on the inner surface of the panel in the light-shielding area;

an inner resin layer disposed on a surface of the decorative layer;

a conductive connection pattern formed on the inner resin layer, the conductive connection pattern being in electrical communication with the electrode layer; and a flexible printed circuit board overlapping and facing the inner resin layer, the flexible printed circuit board having a wiring pattern formed thereon, the wiring pattern facing and being connected to the conductive connection pattern, wherein the inner resin layer is formed of a resin material having a softening temperature higher than that of a resin material of which the decorative layer is formed.

2. The input device according to claim 1, wherein the flexible printed circuit board is attached to the inner resin layer by thermocompression bonding.

3. The input device according to claim 1, wherein the inner resin layer is formed of a resin material having a modulus of elasticity higher than that of a resin material of which the decorative layer is formed.

4. The input device according to claim 1, wherein the decorative layer is formed of an acrylic resin and the inner resin layer is formed of an epoxy resin.

5. The input device according to claim 1, wherein an end of the inner resin layer disposed on the decorative layer forms a step with respect to the surface of the decorative layer, the input device further comprising:

an auxiliary resin layer disposed at the end of the inner resin layer so as to smoothen the step.

6. The input device according to claim 1, wherein the inner resin layer includes a plurality of sublayers stacked such that an end of an upper sublayer of the inner resin layer is misaligned with an end of a lower sublayer of the inner resin layer.

7. The input device according to claim 1, wherein the panel is formed of a synthetic resin.

* * * * *